United States Patent Office 2,761,841
Patented Sept. 4, 1956

2,761,841

TREATMENT OF CLAYS

William E. Brown, Gibsonia, and Clifford R. Giacobine, Oakmont, Pa., assignors to Gulf Research & Development Company, Pittsburgh, Pa., a corporation of Delaware No Drawing. Application November 18, 1954,
Serial No. 469,860

20 Claims. (Cl. 252—8.55)

This invention relates to a process of treating bodies comprised wholly or in part of clays, including clay-like materials, for the purpose of maintaining and/or restoring the permeability to fluids of such bodies and rendering them stable toward disruption by mechanical and/or chemical forces. More particularly, this invention relates to a process of treating bodies comprised wholly or in part of clays, including clay-like materials, subject to swelling and/or dispersion, with subsequent loss of permeability and reduction in mechanical strength, for the purpose of maintaining and/or restoring the permeability to fluids of such bodies and rendering them stable toward disruption by mechanical and/or chemical forces.

Clay-containing bodies often are substantially impermeable or have a low permeability to fluids or lose some or all of the permeability they may possess when they are subjected to the action of liquids such as water, certain brines, emulsions containing water or certain brines, etc. Treatment of such clay bodies in accordance with the process of this invention will render them permeable, prevent a reduction in fluid permeability and/or restore fluid permeability to those clay bodies in which it has been lost. As a result of the treatment the resistance of the clay bodies to mechanical and/or chemical disintegration will also be substantially increased.

The clay or clay-like materials which can be treated in accordance with our invention can include any natural geologic formations or artificial formations such as railroad or highway embankments, road beds and road surfaces, automobile parking areas, areas for outdoor sports, storage areas, military installations, etc. Included also among the materials which can be treated to improve or maintain their permeability and their physical and/or chemical stability are manufactured articles containing clays or clay-like materials. As an example, but without being limited thereto, this process can be employed to treat articles cast, extruded or otherwise formed from clay to increase their mechanical strength prior to and/or after firing.

The process of this invention has particular applicability in the treatment if natural geologic formations for the purpose of preventing or correcting the loss in permeability thereof caused by swelling and/or dispersing of the clay contained therein, preserving the approximate geometry of the grains of the formation, maintaining the pore distribution of the formation and firming the formation if it is uncemented or poorly cemented. More specifically, this invention is especially advantageous in the treatment of a clay-containing formation adjacent a borehole in wells in order to increase, maintain and/or restore the permeability of the formation by rendering the clay contained therein resistant to swelling, disruption and/or migration, and also to shrink essentially irreversibly the hydrated, swollen clay which may be present in said formations adjacent wells producing fluids, such as hydrocarbons, water, etc., or in wells which are used to inject such fluids into a geologic formation. The clay in the formation can be that which was present originally, or it can be clay which was introduced into the formation in the process of creating the borehole, e. g., by the use of a clay-containing drilling mud, or in subsequent operations.

The clay originally present in the formation can reduce the permeability of the formation by swelling and/or migrating to form bridges or blocks in the pores of the formation or in perforations in casing, screens, etc., used in well completions, as a result of contact of said clay with aqueous liquids such as water, certain brines, emulsions containing water or certain brines, etc. This liquid can be introduced into the formation as drilling mud filtrate, injection water, water from leaks in or behind the casing, or ground water associated with the formation. Of particular concern in the case of introduced clay is that clay which, as a component of the drilling mud, invades the formation during the drilling of the borehole. High swelling montmorillonite is often used in drilling muds, among other reasons, because of its ability to create a low permeability filter cake on the formation. Under some conditions, a low permeability zone is created within the formation in the vicinity of the borehole from invasion by the drilling mud. In addition, if the mud filter cake is not removed completely when drilling has been completed, it forms a barrier to the flow of fluid into or out from the formation. The invention disclosed and claimed herein will shrink the hydrated, swollen clay in the formation, mud cake, and/or invade zone so as to substantially increase the permeability and mechanical and chemical stability of the formation.

Among the clays which may be present originally in natural geological formations or may have been introduced therein and which can be effectively treated in accordance with the present invention there are included clay minerals of the montmorillonite group such as montmorillonite, saponite, nontronite, hectorite, and sauconite; the kaolin group such as kaolinite, nacrite, dickite, and halloysite; the hydrous mica-group such as hydrobiotite, glauconite, illite and bramallite; the chlorite group such as chlorite and chamosite; clay minerals not belonging to the above groups such as vermiculite, attapulgite, and sepiolite; and mixed-layer varieties of the above minerals and groups. The clay content of the formations can be comprised substantially of a single species of clay mineral, or of several species, including the mixed-layer types of clay. Of the clay minerals commonly encountered in the drilling of wells in natural geological formations which can be productive of the difficulties herein noted and which can be treated effectively in accordance with the present invention are clay minerals selected from the class consisting of the montmorillonite group, hydrous-mica group, chlorite group, and kaolin group. It will be understood that the clay formations treated in accordance with the invention need not be composed entirely of clay but may contain other mineral components associated therewith.

Clays can swell and/or disperse, disintegrate or otherwise become disrupted in the presence of aqueous fluids. A clay which swells is not limited to expanding lattice-type clays but includes all those clays which can increase in bulk volume with or without dispersing, disintegrating or otherwise becoming disrupted when subjected to contact with aqueous solutions such as water, certain brines, etc. Certain clays can also disperse, disintegrate or otherwise become disrupted without swelling in the presence of aqueous solutions such as water, certain brines, emulsions containing water or certain brines, etc. Some clays in the presence of such aqueous solutions will expand and be disrupted to the extent that they will become unconsolidated and move into a borehole. Formations which consist largely of clay can develop pressures on the order of several thousand pounds per square inch upon absorbing water in a confined space.

The clay materials defined above occur as minute, plate-like, tube-like and/or fiber-like particles having an extremely large surface area compared to that of an equivalent quantity of a granular material such as sand. This combination of small size and great surface area results in a high surface energy with attendant unusual surface properties and extreme affinity for surface-active agents. The structure of some of these clays, as for instance montmorillonite, can be pictured as a stack of sheet-like three-layer lattice units which are weakly bonded to each other and which are expanded in the "c" crystallographic direction by water or other substances which can penetrate between the sheets and separate them.

All clay minerals have ion-exchange properties. Thus, for example, montmorillonite has a cation-exchange capacity of from about 90 to 130 milliequivalents per 100 grams of pure clay, illite from about 20 to 40 milliequivalents, and kaolinite from about 5 to 15 milliequivalents. Under ordinary oil-well conditions the ion-exchange reactions between the clays and substances associated with the clays and capable of reacting therewith are essentially reversible.

The properties of the clays vary widely with the cations occupying the base-exchange positions or sites. A "base-exchange position or site" can be defined as an area, in this instance on a clay crystal, which has associated with it an exchangeable cation. Among the cations which are generally found on the base-exchange position or site can be mentioned sodium, potassium, calcium, magnesium, iron, hydrogen, etc. These cations are believed to be held to the clay surface by ionic forces.

The cations occupying the base-exchange sites on the clay can be those originally present or cations finding their way to the base-exchange position from the liquids in contact therewith. Accordingly, the nature and concentrations of ions in the water in contact with the clay can determine the cations occupying the base-exchange sites. In most oil well formations, the natural waters associated therewith contain sodium as the predominant cation, with calcium, magnesium and other cations present in much smaller quantities. Since the base-exchange positions on the clay are occupied by cations, in many cases the cation will be sodium when natural ground waters such as those described above are associated therewith. Unfortunately, however, as for example in the case of the sodium form of montmorillonite, these clay minerals swell in the presence of water or certain brines and can, in some instances, exert pressures up to thousands of pounds per square inch. Thus, dependent upon the amount of water absorbed, the clay can change to a rigid paste or a gelatinous mass, or if sufficient water is present, the clay can disperse completely into the aqueous phase.

We have found that the difficulties noted above can be substantially reduced and a clay body can be stabilized to impart or maintain satisfactory permeability to fluids, improved mechanical strength and increased resistance to chemical attack by treating such clay body with substituted ammonium ions derived from heterocyclic nitrogen compounds selected from the group consisting of quinoline, isoquinoline, monomethyl, and dimethyl derivatives thereof, and N-methyl, N-ethyl, and N-propyl derivatives thereof. While the substituted ammonium ions defined above are effective clay-stabilizing agents, the parent basic nitrogen compounds from which the substituted ammonium ions are derived have essentially no clay-stabilizing action.

The substituted ammonium ions can be obtained, among other ways, from salts prepared by reacting an appropriate basic nitrogen compound of the class described with an acid, preferably one whose anionic component will not form a precipitate with ions associated with substances such as aqueous fluids with which the substituted ammonium salt may come in contact. Thus, if the fluids contain a significant concentration of alkaline earth ions, it is inadvisable to employ salts whose anionic component may be sulfate, oxalate, etc., since a precipitate can result. Among the compounds which can be employed in preparing the salts are hydrochloric acid, hydrobromic acid, nitric acid, lactic acid, citric acid, salicylic acid, etc., lower fatty acids such as formic, acetic, propionic, etc., and methyl bromide, ethyl bromide, isopropyl iodide, etc. Among the salts which are satisfactory for use in accordance with the present invention are quinolinium chloride, quinolinium iodide, quinolinium propionate, isoquinolinium chloride, isoquinolinium acetate, 3-methylisoquinolinium chloride, 3-methylisoquinolinium nitrate, 3-methylisoquinolinium formate, 4-methylquinolinium chloride, 4-methylquinolinium bromide, 4-methylquinolinium salicylate, 8-methylquinolinium chloride, 8-methylquinolinium iodide, 8-methylquinolinium acetate, 2,6-dimethylquinolinium chloride, 2,6-dimethylquinolinium acetate, 2,6-dimethylquinolinium bromate, 2,6-dimethylquinolinium butyrate, 1-ethylquinaldinium iodide, 1-ethylquinolinium iodide and 1-ethyl-2,6-dimethylquinolinium iodide.

In treating the clay, substituted ammonium ions or mixtures of the substituted ammonium ions dissolved in any suitable polar solvent such as water, methyl alcohol, ethyl alcohol, mixed solvents, etc. can be employed. The solution employed can be of any desired concentration, from as little as one-hundredth molar to a saturated solution, but preferably in a concentration of about 0.75 to about one and one-half molar.

The amount of solution necessary to treat the clay body and obtain the beneficial results of this invention depends on a number of variables, for example the amount of clay, the concentration of the treating solution, the porosity of the clay body, the desired depth of penetration into the clay body and the type of clay to be treated. In general, the clay is contacted with solutions of substituted ammonium ions in such amounts as to provide at least 1, and preferably at least 5, milliequivalents of substituted ammonium ions per milliequivalent of base-exchange capacity of the clay. In any case, best results are obtained by using an excess of substituted ammonium ions, measured as milliequivalents, over the number of base-exchange positions, also measured as milliequivalents, on the clay to be treated.

To treat the clay with the solution containing the substituted ammonium ions any suitable method that will assure effective contact between the solution and the clay can be employed. In treating a formation adjacent a well, for example, the solution containing the substituted ammonium ions can be spotted adjacent the formation or formations to be treated and then be permitted to permeate the formation, pressure being used to force the solution into the formation if desired. In addition, the solution can be used to treat an oil well formation by spotting, prior to shooting, a sufficient amount of the solution in a well bore adjacent a section to be shot and then shooting. Also, in gun perforating or jet perforating a well, solution can be spotted through the interval to be perforated and the gun then inserted and fired in the hole opposite the interval. In secondary recovery, such as a water flood program, the treating solution can be used in front of the flood to stabilize the clay in the formation as the flood progresses through the formation, thus precluding a drop in injection rate caused by reduced permeability due to swelling and/or dispersing of the clay. In treating the formation adjacent a bore-hole of a well which is producing hydrocarbons, the beneficial results of this invention can be obtained by treating the formation with sufficient of the treating fluid to obtain a penetration of at least one foot and preferably between about 5 and 50 feet, and then returning the well to production.

The mechanism involved in treating clays in accordance with our invention is an ion-exchange reaction between exchangeable cations of the clay and the substituted ammonium ions in the treating solution. When the clay is contacted with the substituted ammonium ions identified above, the substituted ammonium ions exchange quickly and in an essentially irreversible manner with the cations occupying the base-exchange sites on the clay structure. As a result of this treatment, hydrated, swollen clay will shrink essentially irreversibly, unhydrated clay will be rendered insensitive to water and other swelling agents, and the resistance of the clay to mechanical and chemical attack will be increased.

In order to demonstrate the effectiveness of the substituted ammonium ions identified above as clay-stabilizing agents, we have run a series of tests in which various substituted ammonium ions were employed. The substituted ammonium ions were formed by dissolving in water salts obtained by the reaction of the basic heterocyclic nitrogen compound with a halogen acid. Montmorillonite was chosen as the clay for these tests because of its very high ability to swell and disperse. The tests comprised placing 0.077 gram of montmorillonite (0.077 milliequivalent base-exchange capacity) suspended in 5.0 milliliters of a salt solution in a test tube. One liter of the salt solution prior to suspending montmorillonite therein contained 2,317 milligrams of sodium bicarbonate, 279.9 milligrams of calcium chloride hydrate, 434.2 milligrams of magnesium chloride hydrate, and 0.86 milligram of magnesium sulfate. The contents of the test tube were allowed to set for 48 hours, after which the amount of precipitate was measured. The substituted ammonium ion was then added to the contents of the test tube in an amount equal to five times the base-exchange capacity of the clay and the mixture was shaken for 15 minutes and subsequently allowed to stand for 24 hours. At the end of this period the volume of clay precipitate was estimated and such quantity of supernatant liquid was withdrawn from the test tube that the volume of the liquid and clay remaining was the same as the volume of the clay suspension originally treated. Fifteen milliliters of distilled water were added to the resulting mixture and the test tube was shaken for 15 minutes and allowed to stand for 24 hours, after which the volume of clay precipitate was again estimated. This cycle was repeated a number of times. At about the 15th test cycle and for one cycle only, a salt solution similar to that in which the montmorillonite was initially dispersed was substituted for the distilled water. Otherwise, the procedure was not changed. Each cycle results in a decrease in the salt concentration of the aqueous solution and the concentration of treating agent in equilibrium with the clay precipitate. This dilution process will cause swelling and/or dispersion of the clay if it has not been effectively stabilized. The substitution of the original salt solution for the distilled water at about the 15th test cycle is a test for the reversibility of the base-exchange reaction. Thus, if the treating agent is not held essentially irreversibly by the clay, part or all of it will be exchanged for sodium ions or other cations from the salt solution and the clay will swell and disperse in subsequent cycles of distilled water leaching.

The results of these tests are tabulated below in Table I.

TABLE I

| Compound | A<br>Cycles to Colloidal Appearance | B<br>Cycles to Swelling and/or Dispersion |
| --- | --- | --- |
| Quinolinium chloride | * | * |
| Isoquinolinium chloride | * | * |
| 3-methylisoquinolinium chloride | * | * |
| 2-methylquinolinium chloride | * | * |
| 4-methylquinolinium chloride | * | * |
| 8-methylquinolinium chloride | * | * |
| 2,6-dimethylquinolinium chloride | * | * |
| 1-ethylquinolinium iodide | * | * |
| 1-ethylquinaldinium iodide | * | * |
| 1-ethyl-2,6-dimethylquinolinium iodide | * | * |
| 6-nitroquinolinium chloride | 6 | a |
| 3-aminoquinolinium chloride | 17 | a |
| 8-aminoquinolinium chloride | 18 | a |
| Acridinium chloride | b | 1 |

(*) denotes that the test was discontinued at the end of 24 cycles and no swelling, dispersion, or colloidal appearance was noted.
(a) denotes that the test had a colloidal appearance at the cycle indicated in column "A" but had not swelled or dispersed at the end of 24 cycles.
(b) denotes that the sample did not exhibit a colloidal appearance or disperse but had swelled markedly at the cycle indicated in column "B."

In the above table, by "colloidal appearance" it is meant that after standing 24 hours the supernatant liquid retains a turbid or opalescent appearance characteristic of that caused by the scattering of incident light by suspended colloidal particles. The appearance of such a colloidal condition indicates that the clay has not been stabilized by the substituted ammonium ion tested. By "swelling" it is meant that the settled volume of the clay at the end of 24 hours is at least 1½ times the settled volume of the clay at the beginning of the test. By "dispersion" it is meant that the clay is dispersed uniformly throughout the liquid so that at the end of 24 hours no precipitate or sediment can be detected. Obviously, when the clay swells or disperses it has not been stabilized by the particular substituted ammonium ion tested.

The above table graphically illustrates the advantages of the present invention. Thus, it can be seen that many substituted ammonium ions derived from heterocyclic nitrogen compounds related to quinoline are unsatisfactory as treating agents for stabilizing clays. As can be seen from the above table, substituted ammonium ions derived from 6-nitroquinolinium chloride, 3-aminoquinolinium chloride, 8-aminoquinolinium chloride, and acridinium chloride are not effective clay-stabilizing agents. Substituted ammonium ions derived from salts of quinoline, isoquinoline, monomethyl and dimethyl derivatives thereof, and N-methyl, N-ethyl and N-propyl derivatives thereof, however, are very effective, for even at the end of 24 cycles clays treated therewith are unaffected by water or a salt solution.

The effectiveness of substituted ammonium ions derived from a heterocyclic nitrogen compound such as quinoline as a clay-stabilizing agent is further demonstrated in the following series of flow studies employing cylindrical samples of core material about 40 millimeters in length and 25 millimeters in diameter obtained at a depth of 4152 feet in the lower Kernco zone of the Fruitvale field in California. The core material, light brown in color and consisting of friable sand, pebbles, silt and clay including a high percentage of montmorillonite, was mounted in a lucite flow cell and the annulus between the lucite holder and the core sample was filled with paraffin wax. Two samples of this core were mounted and flowed axially under varying conditions as indicated below.

Sample No. 1

A. FLOW WITH AN AQUEOUS SALT SOLUTION

This sample was flowed with an aqueous salt solution (one liter of the solution containing 2,317 milligrams of sodium bicarbonate, 279.9 milligrams of calcium chloride hydrate, 434.2 milligrams of magnesium chloride hydrate, and 0.86 milligrams of magnesium sulfate) at a series of pressures as follows: at a pressure gradient of 0.033 atmosphere per centimeter the permeability was 246 millidarcys, at 0.066 atmosphere per centimeter the permeability was 273 millidarcys, at 0.10 atmosphere per centimeter the permeability was 291 millidarcys and at the final pressure of about 0.13 atmosphere per centimeter the permeability was 273 millidarcys. No evidence of disruption of the core was noted.

B. FLOW WITH DISTILLED WATER

The sample described above was next flowed with distilled water. About 15 milliliters of effluent was collected before measurements were taken in order to flush the salt solution out of the sample. It became evident that as soon as the fresh water invaded the core the permeability thereof began to drop. At a pressure gradient of about 0.03 atmosphere per centimeter the permeability was 28 millidarcys, after a short period of flow at 0.099 atmosphere per centimeter the permeability was 16 millidarcys and at 0.26 atmosphere per centimeter the permeability rose to 65 millidarcys; the effluent showed a slight turbidity at this time. The distilled water flow through the sample was maintained at the above pressure gradient for 40 minutes after which period the permeability had dropped to 18 millidarcys. The mount was struck sharply several times and a small portion of the exit face of the core was dislodged. About one milliliter of sand and silt was deposited on the lower surface of the exit tube and the effluent liquid became very turbid. After standing for about 15 hours flow was started again with distilled water at a pressure gradient of 0.26 atmosphere per centimeter and the permeability was observed to have dropped to 6 millidarcys.

C. TREATMENT WITH QUINOLINIUM CHLORIDE SOLUTION

The sample described above, in the plugged condition, was next treated with a one molar aqueous quinolinium chloride solution. A total of about 30 milliliters of the treating solution was passed through the core in the same direction as the previous flow. In about one minute after the flow was started at a pressure gradient of 0.026 atmosphere per centimeter the permeability had risen to 51 millidarcys and 6 minutes later the permeability at the same pressure was 210 millidarcys.

D. FLOW WITH DISTILLED WATER

Next the treated sample as described above was flowed with distilled water at about the same pressure gradient used previously, 0.25 atmosphere per centimeter. After 10 milliliters of eluate was collected the permeability was 336 millidarcys. In less than 5 minutes the flow rate had stabilized at 495 millidarcys permeability. The mount was struck sharply as before but no disruption of the sample was noted. The permeability was determined at several lower pressure gradients and was found to vary from 396 to 495 millidarcys. It should be noted that these permeabilities are appreciably greater than the original value for this sample with the aqueous salt solution. Finally, the pressure gradient was again raised to 0.24 atmosphere per centimeter and the permeability duplicated the previous value of 495 millidarcys. In this test, the treatment with the substituted ammonium ions apparently not only restored the lost permeability but also maintained it above that initially observed.

Sample No. 2

A. FLOW WITH QUINOLINIUM CHLORIDE SOLUTION

A one-molar aqueous solution of quinolinium chloride was flowed through a sample, similar to Sample No. 1, at a pressure gradient of 0.014 atmosphere per centimeter. The color of the quinolinium chloride solution did not appear in the effluent until about 10 milliliters of effluent had collected. The flow of the solution was discontinued when about 50 milliliters of effluent had been collected. There was no evidence of silt or clay migrating out of the core.

B. FLOW WITH DISTILLED WATER

Flowing of the above core was continued with distilled water at an average pressure gradient of 0.03 atmosphere per centimeter with an initial permeability of 210 millidarcys. After a few minutes the flow rate began to increase slowly and continued to increase, the final permeability at this pressure being about 315 millidarcys. There was no evidence of material being removed from the core and the effluent was clear and showed no indications of colloidal material, etc. When the pressure gradient was increased to 0.061 atmosphere per centimeter the permeability was 325 millidarcys, while at a pressure gradient of 0.099 atmosphere per centimeter the permeability increased to 365 millidarcys. At a pressure gradient of 0.26 atmosphere per centimeter the permeability was 374 millidarcys. No disintegration of the core was noted. While flowing the sample at the latter pressure the mount was repeatedly struck sharply in an attempt to produce mechanical failure of the core material but no adverse effects were noted.

C. FLOW TEST WITH CRUDE OIL

The flow test described above was continued with a viscous Fruitvale crude oil as the flowing medium. The test was started at a pressure gradient of 0.066 atmosphere per centimeter and it was noted that the flow rate dropped considerably when the crude oil began to penetrate the core. After about 20 minutes a small quantity of crude oil had collected in the effluent tube and the entire exit face of the core was stained with crude oil. The flow rate was too low to measure because of the high viscosity of the crude oil. The pressure was released and the test discontinued. The sample was removed from the mount and split longitudinally for examination. No evidence of migration or plugging was noted and the clay appeared to be in an agglomerated, stabilized form.

There follow illustrative embodiments of the actual practice of the process of this invention as applied to oil wells producing from formations containing clay. It is understood that the procedures described are illustrative and the invention is not to be limited thereby.

In treating a formation adjacent the bottom of a borehole to stabilize the clay, said formation containing about 5 per cent by weight of montmorillonite and having a porosity of about 15 per cent, so as to attain a radial depth of treatment of at least 5 feet from the borehole, about 150 gallons of a one-molar aqueous solution of substituted ammonium ions derived from quinolinium chloride for each foot of vertical thickness of the formation to be treated is used. While theoretically only about 70 gallons of the above treating solution would be needed to react with all of the clay in the above volume of formation, an excess over the theoretical quantity is employed to assure rapid and complete reaction with the clay. The treating solution is introduced through a string of small diameter pipe lowered to within a few feet of the bottom of the hole and allowed to flow in by gravity. Since the treating solution has a much higher specific gravity than water, oil or ordinary oil field brines, it will displace water or oil opposite the formation to be treated and will then flow into the formation. As an aid in displacing the treating solution into the formation, pressure can be employed. The treating solution is introduced into the formation slowly and allowed to remain in contact with the formation for about 24 hours, after which the unused portion, along with produced fluid, is withdrawn from the well. It will be understood that, instead of treating formations adjacent the bottom of a borehole, any selected formation interval above the bottom of the borehole can be treated in accordance with the invention by setting a bridge plug, in known manner, at the bottom of the formation to be treated, and thereafter proceeding as described above considering the top of the bridge plug to be the bottom of the borehole.

The process of this invention is also used to advantage in secondary recovery operations wherein a displacement fluid such as water is applied under pressure to an oil-bearing formation by means of specially equipped input wells penetrating said formation for the purpose of forcing the oil out of the oil-bearing formation through an output well penetrating said formation. Such operations are often developed in what is termed a "five-spot" pattern, with the producing well located in the center of a square formed by water input wells at the four corners. By introducing any of the treating solutions disclosed herein into the water input wells prior to injection of water, the treating solution will move ahead of the advancing water and thus stabilize the clay in the formation before the clay has had an opportunity to come in contact with the injection water and be deleteriously affected by contact therewith. In actual practice, the treating solution is placed adjacent the formation to be treated by introducing the same through a string of small diameter pipe lowered to a point adjacent the section of the formation to be treated in the manner described in the paragraph next preceding and is followed by normal injection of water. To establish a front of the treating solution about five feet thick (radially) ahead of the injection water at a radius of about 20 feet from the borehole in a formation having the same montmorillonite content and porosity described above, about 650 gallons of a one-molar aqueous solution of quinolinium chloride is sufficient for each foot of thickness (vertical) of the formation to be treated. Because of prior treatment in accordance with the invention, a satisfactory permeability of the clay during the water flood is maintained or improved, thereby leading to more efficient recovery of the fluids to be produced.

The treating solutions herein disclosed are also employed with advantage in oil well perforating. When clay-water drilling muds are used in rotary drilling, they seal off the openings in porous formations encountered while drilling. In well completions where such formations are cased off and the casing must be perforated for production, the sealing property of clay-water muds can be detrimental. Since the hydrostatic head of the mud in the borehole exceeds the formation pressure, when the casing is perforated the clay-water mud rushes into the perforated formation until a mud cake seal is established or the pressure is balanced. This often is accompanied by a fresh water loss to the formation, which in the clay formations described, swells the clay which is present. In addition, there often results blocking of the perforated formation to such an extent that on subsequent completion of the well the perforations have to be washed or acidized with reagents known as "mud clean out" agents.

To avoid such difficulties in perforating operations in accordance with the present invention, a string of tubing is lowered into the borehole so that its lower end is adjacent the bottom of the section to be treated and about 300 gallons of a suitable oil-base drilling fluid is introduced through the tubing to displace the clay-water drilling mud upwardly in the borehole. About 150 gallons of a one-molar aqueous solution of the treating solution, e. g., quinolinium chloride, for each foot of thickness of the formation is thereafter introduced through the tubing and in turn displaces the oil-base drilling fluid upwardly in the borehole. The perforating gun, either bullet or jet, is then lowered into the treating solution opposite the formation to be treated and the casing perforated in the usual manner. The hydrostatic head in the borehole exceeds the formation pressure and thus will force the treating solution into the formation. In this way, the naturally-occurring clay, which was exposed to fresh water lost to the formation from the clay-water drilling fluid, will be shrunken and stabilized and when the well is permitted to flow, or is swabbed or pumped, the unused clay stabilizing agent in the treating solution will be produced from the formation. This operation will leave the formation substantially free from plugging by mud cake or other hydrated clay. Thus, by employing any one of the treating agents disclosed herein while perforating, the formation will be prevented from being mudded off, the harmful effects of fresh water on naturally-occurring clay will be nullified, the necessity for washing perforations with so-called "mud acids" will be eliminated, and the use of conventional clay-water drilling muds will be permitted in areas where the producing formations contain swelling-type clays and the more expensive oil-base muds are commonly used.

Similarly in oil well shooting in open hole with high explosives, such as nitroglycerine, trinitrotoluene, etc., the freshly exposed formation may also be contacted with a clay-water drilling fluid with the accompanying harmful effects described above. The drilling fluid opposite the formation to be treated in such case can be replaced with an oil-base drilling fluid followed by the treating solution in the manner described above, and the explosive can be lowered into the solution and detonated in the customary manner. The beneficial results obtained in employing the treating solutions of the invention while perforating will also accompany their use with high explosives.

While we have found that the specific substituted ammonium ions disclosed herein or mixtures thereof are satisfactory for the purposes of this invention, there are certain instances wherein it is advantageous to employ in admixture therewith other substituted ammonium ions not specifically disclosed herein but which have similar properties thereto, as for example, the substituted ammonium ions disclosed in our copending applications filed concurrently herewith, application Serial Nos. 469,855 to 469,859, inclusive, and 469,861, as well as in the other concurrently filed copending applications in the name of William E. Brown, application Serial Nos. 469,854 and 469,862. For example, although by far the greatest portion of the base-exchange sites on a clay mineral surface will have an area approximating the average area per exchange site, a small number of sites will have an area considerably less than the average. Because of the spatial configuration of their hydrophobic part, certain substituted ammonium ions will not be able to occupy these smaller sites, in which case it is advantageous to use one or more additional substituted ammonium ions of different spatial configuration which can occupy the remaining positions and thus complete the stabilization reaction. It is believed that this use is especially advantageous in the case of the mixed-layer clay minerals.

Obviously, many modifications and variations of the invention, as hereinabove set forth, may be made without departing from the spirit and scope thereof, and therefore only such limitations should be imposed as are indicated in the appended claims.

We claim:

1. A method of stabilizing a clay-containing body which comprises contacting such clay-containing body with substituted ammonium ions derived from heterocyclic nitrogen compounds selected from the group consisting of quinoline, isoquinoline, monomethyl and dimethyl derivatives thereof, and N-methyl, N-ethyl and N-propyl derivatives thereof in such amounts as to provide at least about one milliequivalent of the substituted ammonium ion per milliequivalent of base-exchange capacity of the clay.

2. A method of stabilizing a clay-containing body as in claim 1 in which the clay-containing body comprises at least one clay mineral selected from the class consisting of the montmorillonite group, hydrous-mica group, chlorite group, and kaolin group.

3. A method of stabilizing a clay-containing body which comprises contacting such clay-containing body with substituted amonium ions derived from quinoline in such amounts as to provide at least about one milliequivalent of the substituted ammonium ion per milliequivalent of base-exchange capacity of the clay.

4. A method of stabilizing a clay-containing body as in claim 3 in which the clay-containing body comprises at least one clay mineral selected from the class consisting of the montmorillonite group, hydrous-mica group, chlorite group, and kaolin group.

5. A method of stabilizing a clay-containing body which comprises contacting such clay-containing body with substituted ammonium ions derived from isoquinoline in such amounts as to provide at least about one milliequivalent of the substituted ammonium ion per milliequivalent of base-exchange capacity of the clay.

6. A method of stabilizing a clay-containing body which comprises contacting such clay-containing body with 1-ethylquinolinium ions in such amounts as to provide at least about one milliequivalent of the substituted ammonium ion per milliequivalent of base-exchange capacity of the clay.

7. A method of stabilizing a clay-containing body which comprises contacting such clay-containing body with 1-ethylquinaldinium ions in such amounts as to provide at least about one milliequivalent of the substituted ammonium ion per milliequivalent of base-exchange capacity of the clay.

8. A method of stabilizing a clay-containing body which comprises contacting such clay-containing body with 1-ethyl-2,6-dimethylquinolinium ions in such amounts as to provide at least about one milliequivalent of the substituted ammonium ion per milliequivalent of base-exchange capacity of the clay.

9. A method of stabilizing a clay-containing formation adbjacent a well bore which comprises contacting such clay-containing formation with a solution of substituted ammonium ions derived from heterocyclic nitrogen compounds selected from the group consisting of quinoline, isoquinoline, mono-methyl and dimethyl derivatives thereof, and N-methyl, N-ethyl and N-propyl derivatives thereof having a concentration of at least about 0.75 molar and in such amount as to provide at least about one milliequivalent of the substituted ammonium ion per milliequivalent of base-exchange capacity of the clay.

10. A method of stabilizing a clay-containing formation adjacent a well bore which comprises contacting such clay-containing formation with a solution of substituted ammonium ions derived from quinoline having a concentration of at least about 0.75 molar and in such amount as to provide at least about one milliequivalent of the substituted ammonium ion per milliequivalent of base-exchange capacity of the clay.

11. A method of stabilizing a clay-containing formation adjacent a well bore which comprises contacting such clay-containing formation with a solution of substituted ammonium ions derived from isoquinoline having a concentration of at least about 0.75 molar and in such amount as to provide at least about one milliequivalent of the substituted ammonium ion per milliequivalent of base-exchange capacity of the clay.

12. A method of stabilizing a clay-containing formation adjacent a well bore which comprises contacting much clay-containing formation with a solution of 1-ethylquinolinium ions having a concentration of at least about 0.75 molar and in such amount as to provide at least about one milliequivalent of the substituted ammonium ion per milliequivalent of base-exchange capacity of the clay.

13. A method of stabilizing a clay-containing formation adjacent a well bore which comprises contacting such clay-containing formation with a solution of 1-ethylquinaldinium ions having a concentration of at least about 0.75 molar and in such amount as to provide at least about one milliequivalent of the substituted ammonium ion per milliequivalent of base-exchange capacity of the clay.

14. A method of stabilizing a clay-containing formation adjacent a well bore which comprises contacting such clay-containing formation with a solution of 1-ethyl-2,6-dimethylquinolinium ions having a concentration of at least about 0.75 molar and in such amount as to provide at least about one milliequivalent of the substituted ammonium ion per milliequivalent of base-exchange capacity of the clay.

15. A method of recovering oil from an oil-bearing formation containing clay, wherein a displacement fluid under pressure is applied to said formation through at least one input well penetrating said formation, and wherein oil is recovered from an output well penetrating said formation, which comprises introducing a treating solution containing substituted ammonium ions derived from heterocyclic nitrogen compounds selected from the group consisting of quinoline, isoquinoline, monomethyl and dimethyl derivatives thereof, and N-methyl, N-ethyl and N-propyl derivatives thereof, into said input well having a concentration of at least about 0.75 molar and in such amount as to provide at least about one milliequivalent of the substituted ammonium ion per milliequivalent of base-exchange capacity of the clay, thereafter introducing said displacement fluid under pressure into said input well, forcing said treating solution through said formation by means of said displacement fluid, and recovering oil from said output well.

16. A method of recovering oil from an oil-bearing formation containing clay, wherein a displacement fluid under pressure is applied to said formation through at least one input well penetrating said formation, and wherein oil is recovered from an output well penetrating said formation, which comprises introducing a treating solution containing substituted ammonium ions derived from quinoline into said input well having a concentration of at least about 0.75 molar and in such amount as to provide at least about one milliequivalent of the substituted ammonium ion per milliequivalent of base-exchange capacity of the clay, thereafter introducing said displacement fluid under pressure into said input well, forcing said treating solution through said formation by means of said displacement fluid, and recovering oil from said output well.

17. A method of recovering oil from an oil-bearing formation containing clay, wherein a displacement fluid under pressure is applied to said formation through at least one input well penetrating said formation, and wherein oil is recovered from an output well penetrating said formation, which comprises introducing a treating solution containing substituted ammonium ions derived from isoquinoline into said input well having a concentration of at least about 0.75 molar and in such amount as to provide at least about one milliequivalent of the substituted ammonium ion per milliequivalent of base-exchange capacity of the clay, thereafter introducing said displacement fluid under pressure into said input well, forcing said treating solution through said formation by means of said displacement fluid, and recovering oil from said output well.

18. A method of recovering oil from an oil-bearing formation containing clay, wherein a displacement fluid under pressure is applied to said formation through at least one input well penetrating said formation, and wherein oil is recovered from an output well penetrating said formation, which comprises introducing a treating solution containing 1-ethylquinolinium ions into said input well having a concentration of at least about 0.75 molar and in such amount as to provide at least about one milliequivalent of the substituted ammonium ion per milliequivalent of base-exchange capacity of the clay, thereafter introducing said displacement fluid under pressure into said input well, forcing said treating solution through said formation by means of said displacement fluid, and recovering oil from said output well.

19. A method of recovering oil from an oil-bearing formation containing clay, wherein a displacement fluid under pressure is applied to said formation through at least one input well penetrating said formation, and wherein oil is recovered from an output well penetrating said formation, which comprises introducing a treating solution containing 1-ethylquinaldinium ions into said input well having a concentration of at least about 0.75 molar and in such amount as to provide at least about one milliequivalent of the substituted ammonium ion per milliequivalent of base-exchange capacity of the clay, thereafter introducing said displacement fluid under pressure into said input well, forcing said treating solution through said formation by means of said displacement fluid, and recovering oil from said output well.

20. A method of recovering oil from an oil-bearing formation containing clay, wherein a displacement fluid under pressure is applied to said formation through at least one input well penetrating said formation, and wherein oil is recovered from an output well penetrating said formation, which comprises introducing a treating solution containing 1-ethyl-2,6-dimethylquinolinium ions into said input well having a concentration of at least about 0.75 molar and in such amount as to provide at least about one milliequivalent of the substituted ammonium ion per milliequivalent of base-exchange capacity of the clay, thereafter introducing said displacement fluid under pressure into said input well, forcing said treating solution through said formation by means of said displacement fluid, and recovering oil from said output well.

References Cited in the file of this patent

UNITED STATES PATENTS

| Number | Name | Date |
|---|---|---|
| 2,033,856 | Smith | Mar. 10, 1936 |
| 2,262,428 | Lietz | Nov. 11, 1941 |
| 2,320,009 | Ralston et al. | May 25, 1943 |
| 2,348,458 | Endersby | May 9, 1944 |
| 2,414,668 | Ratcliffe | Jan. 21, 1947 |
| 2,419,755 | Albaugh | Apr. 29, 1947 |
| 2,472,400 | Bond | June 7, 1949 |
| 2,531,440 | Jordan | Nov. 28, 1950 |
| 2,599,342 | Meadors | June 3, 1952 |
| 2,603,598 | Meadors | July 15, 1952 |
| 2,607,744 | Viles | Aug. 19, 1952 |
| 2,659,693 | Lytle | Nov. 17, 1953 |
| 2,681,314 | Skinner | June 14, 1954 |

FOREIGN PATENTS

| 881,982 | Germany | July 9, 1953 |